D. W. PERIN.
REMOVABLE BODY CONSTRUCTION.
APPLICATION FILED SEPT. 21, 1920.
1,418,966.
Patented June 6, 1922.
4 SHEETS—SHEET 1.
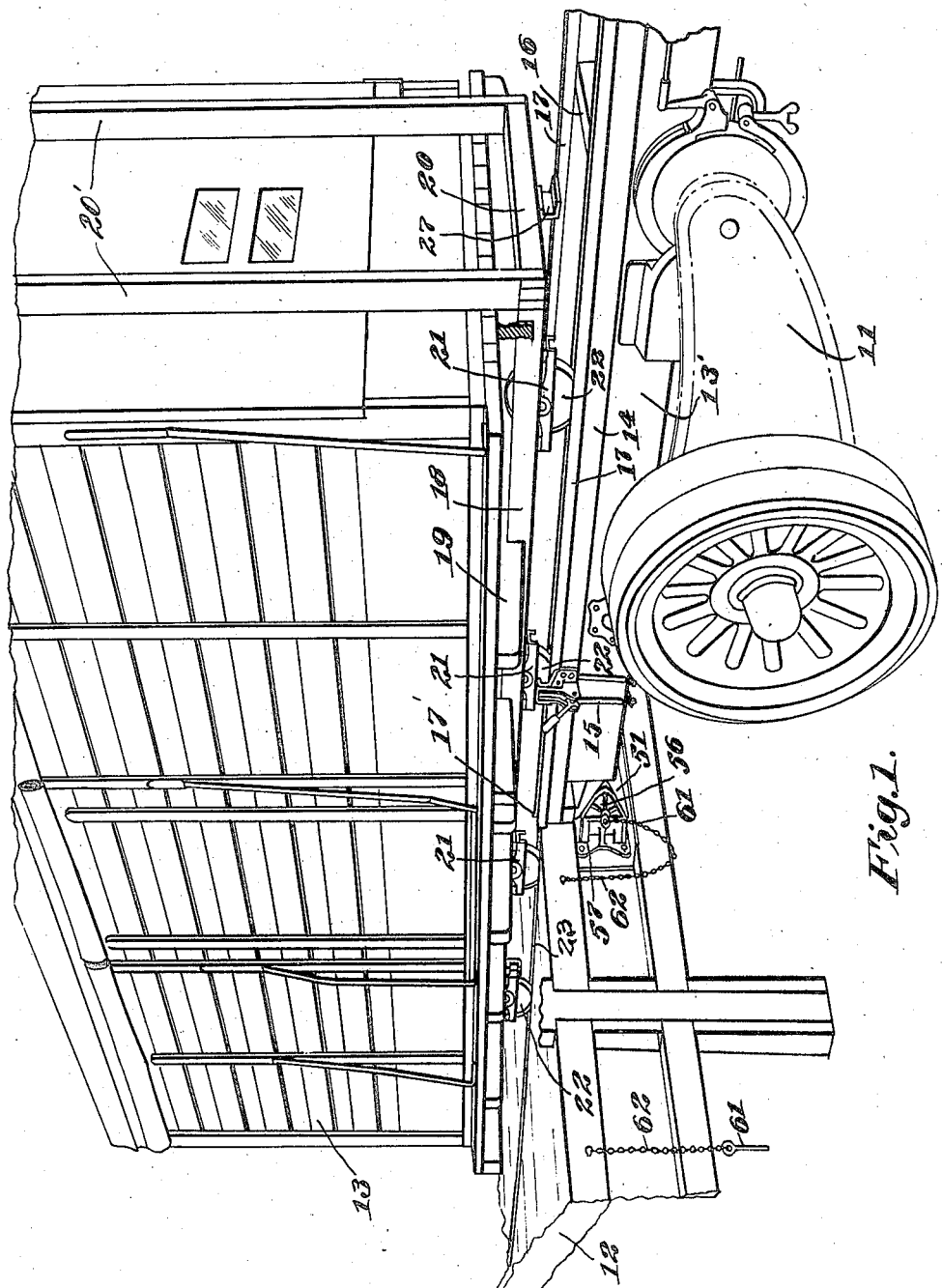
Inventor
Donald W. Perin
by Roberts Roberts & Cushman
his Attorneys

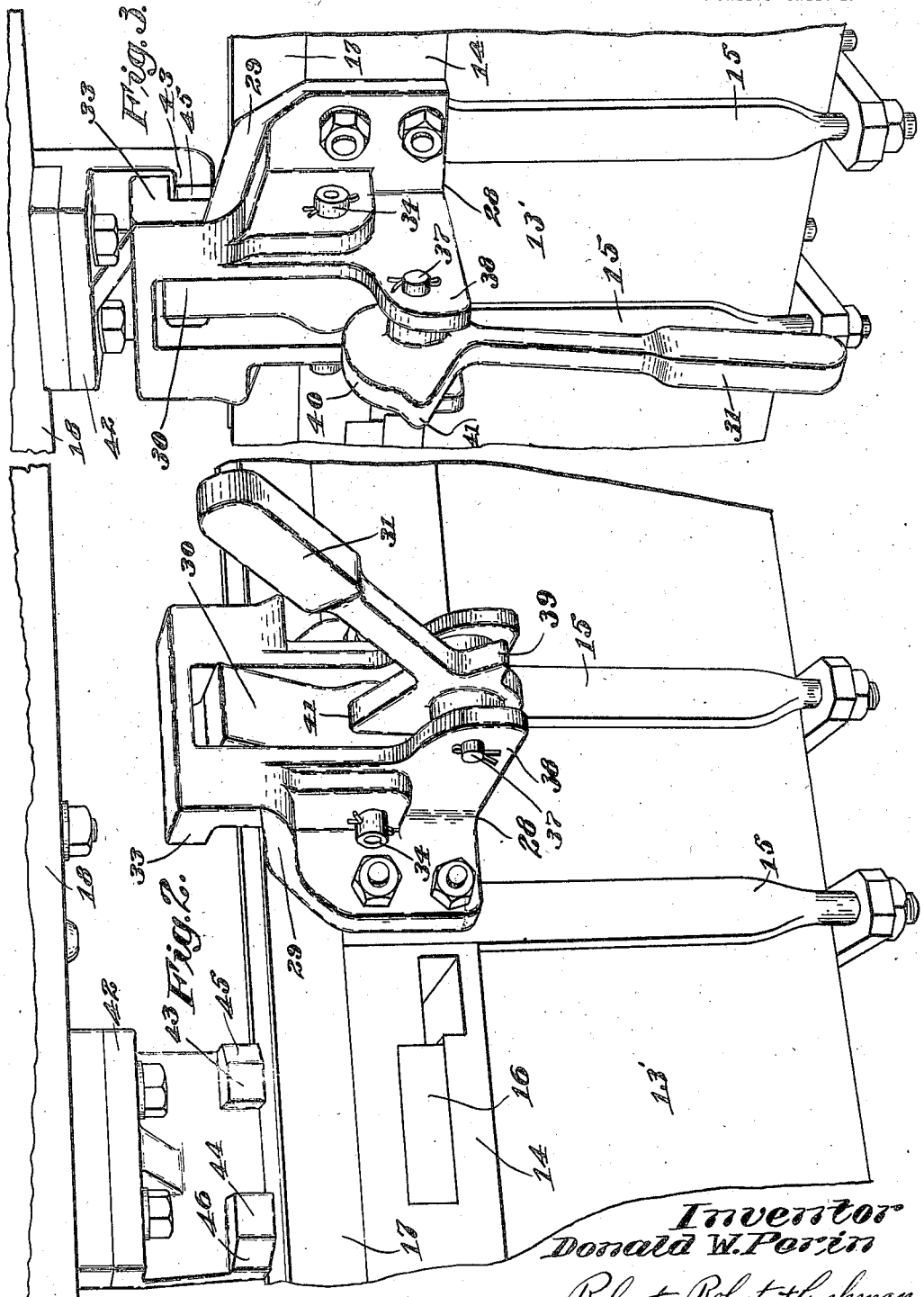

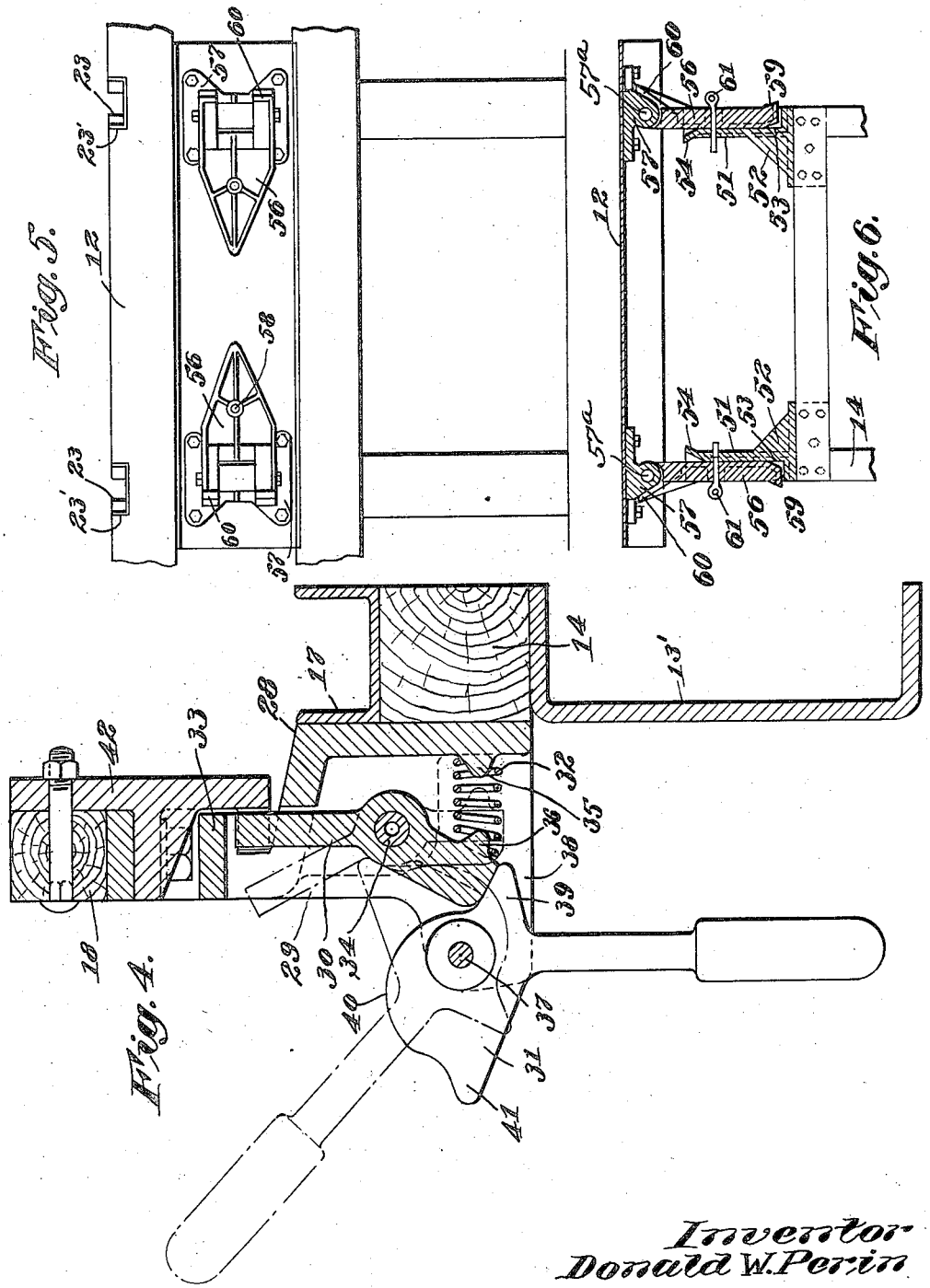

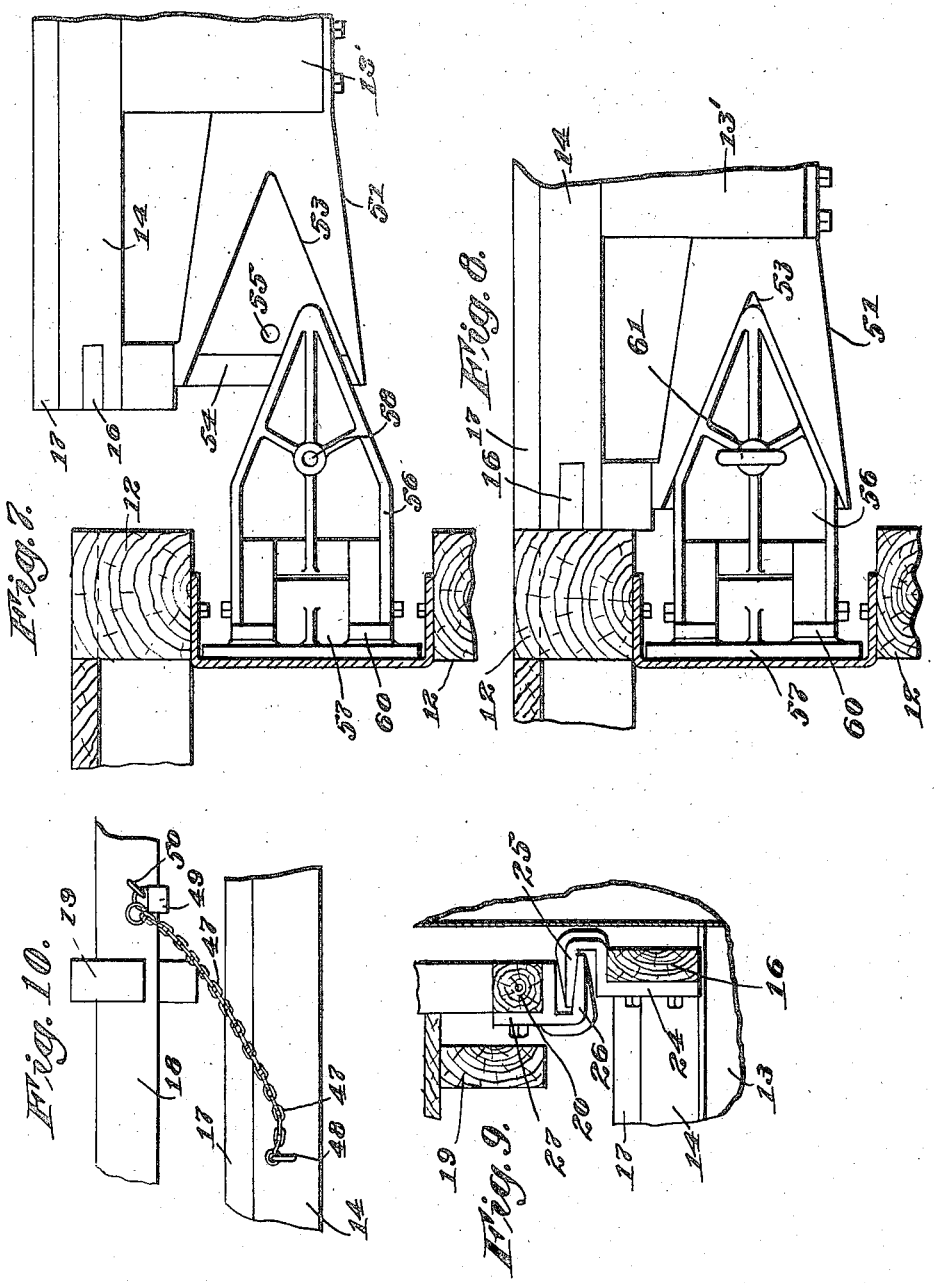

UNITED STATES PATENT OFFICE.

DONALD W. PERIN, OF BROOKLINE, MASSACHUSETTS, ASSIGNOR, BY MESNE ASSIGNMENTS, TO PERIN "ROLOFF" COMPANY, OF SOMERVILLE, MASSACHUSETTS, A CORPORATION OF MASSACHUSETTS.

REMOVABLE-BODY CONSTRUCTION.

1,418,966.      Specification of Letters Patent.      Patented June 6, 1922.

Application filed September 21, 1920. Serial No. 411,711.

*To all whom it may concern:*

Be it known that I, DONALD W. PERIN, citizen of United States, and resident of Brookline, in the county of Middlesex and State of Massachusetts, have invented new and useful Improvements in Removable-Body Constructions, of which the following is a specification.

This invention relates to an improvement in motor vehicle bodies, and more particularly to improvements in bodies of the removable type, and in means for accomplishing the removal and attachment of such bodies.

In the use of motor trucks for transportation of merchandise with a fixed body, the vehicle is of necessity halted for extended periods for loading and unloading the merchandise. In city work where the hauls are short this idle time may run into a high proportion of the total time, thus utilizing very inefficiently the motor vehicle itself with its high initial, maintenance, and operation costs. In order to obviate this high percentage of idle time I have provided a body which may be removed from the vehicle chassis in a short time and replaced by a similar body which has been loaded or unloaded as the case may be.

In the use of such bodies it is essential that the body be anchored to the vehicle chassis in a manner adapted to effectively prevent lost motion and yet to permit ready removal or replacement of the body. In a motor vehicle there is a considerable variation in the height of the chassis top when it has a fully loaded body upon it and when it has no body upon it. This is due both to the compression of the springs and of the tires. In order then to effectively use a removable body it is essential to provide means for adjusting the relative heights of the vehicle chassis and of the platform to or from which the body is to be moved.

It is an object of my invention to provide new and improved means for attaching a removable body to a vehicle chassis and to provide means whereby the body may be removed and replaced with a minimum of effort.

It is also an object to provide a compact unitary body frame adapted to be readily attached to existing bodies or to be fitted with any desired type of body.

It is also an object to provide a sub-frame or chassis frame adapted to be made fast to the chassis of a vehicle, said frame having means for guiding and facilitating the movement thereon and thereof of bodies in loading and unloading the vehicle.

It is an object to provide means for accomplishing these several purposes, which means are simple in construction, positive in their operation and relatively inexpensive to manufacture. Other and further objects will appear as the description proceeds.

In order that my invention may be readily applied to existing vehicles my device comprises a movable or body frame which carries the essential fastening and rolling elements and which may be attached as a unit to existing bodies. This construction is also advantageous in that vehicle bodies are bulky and are not economically manufactured to be shipped great distances, while the unit body frame is compact and may be shipped to the truck user and locally fitted with any desired type of body. The invention further comprises the provision of a subframe or chassis frame adapted to be made fast as a unit to the chassis of existing types of commercial vehicles, said frame having tracks thereon and complemental fastening devices whereby it may cooperate with the body frame in the rapid and easy interchange of unloaded and loaded bodies. This chassis frame is also compact and may be shipped directly to the truck user along with the body frame.

I have shown a preferred embodiment of my invention in the accompanying drawings in which—

Fig. 1 is a perspective view, partly broken away, showing the body partly removed from the vehicle chassis;

Fig. 2 is a fragmentary perspective showing the side locking device in unlocked position;

Fig. 3 is a view similar to Fig. 2 but showing the device in locked position;

Fig. 4 is a vertical cross section of Fig. 3;

Fig. 5 is a fragmentary face view showing the platform registration members in folded back position;

Fig. 6 is a fragmentary plan view partly in section showing the platform and vehicle registration members in engagement;

Fig. 7 is a fragmentary side view showing the platform and vehicle registration members as they enter into engagement;

Fig. 8 is a view similar to Fig. 7 but showing the members fully engaged;

Fig. 9 is a fragmentary view partly in section showing the forward locking members; and Fig. 10 is a fragmentary side view showing an additional method of locking the body to the chassis.

In Fig. 1, a motor truck chassis 11 is shown backed up to a platform 12 and the body 13 is shown partly removed from the truck onto the platform. The truck chassis is formed with the longitudinal bearing members 13′ and to these is attached the fixed subframe 14 held in place thereon by the stirrup straps 15 best shown in Figs. 2 and 3. The subframe comprises longitudinal members clamped to the chassis and held rigid by transverse members 16. The U-shaped rail 17 is bolted to the upper surface of each side member of the sub-frame 14, the rear end of these rails being flared as shown at 17′ in Fig. 1.

The movable body frame 18 is notched into the sills 19 on the under side of the vehicle body 13 as shown in Fig. 1. This frame is also provided with cross braces 20, also with uprights 20′ at the front and rear of the vehicle body. At points between sills the longitudinal members of the body frame 18 carry the journal housings 21 in which are journaled the bearing wheels 22. These wheels fit into the U rail 17 with which they have an easy rolling contact. The platform 12 is provided with similar rails 23 adapted to receive the wheels as shown in Fig. 1, the outer end of these rails being flared as shown at 23′ in Fig. 5.

As shown in Fig. 9, the forward cross member 16 of the fixed frame 14 has bolted thereto the retaining member 24, which has the overhanging portion 25 engaging an overhanging portion 26 of a similar retaining member 27 which is bolted to the forward cross member 20 of the movable body frame. The meeting faces of these two members are formed upon a slight angle as shown.

Adjacent the rear end of each side of the fixed frame 14 are bolted the locking lug assemblies 28 shown in detail in Figs. 2, 3 and 4. These assemblies comprise the main casting 29, locking lever 30, operating lever 31 and spring 32. The main casting is formed with an upper overhanging lip 33 and is bifurcated below the lip to receive the upper end of the locking lever 30 which latter is pivoted in the main casting on the pin 34. The spring 32 is held between the main casting and the lower end of the lever 30 by the nipples 35 and 36. The actuating lever 31 is journaled on the pivot pin 37 which is carried by the ear 38 extending outwardly from the main casting 28. The head of this actuating lever 31 is provided with the point 39 which fits under the lower end of the lever 30 when in the locked position as shown in full lines in Fig. 4 and tends to prevent swinging of the lever 31, and the cam surface 40 and point 41 which operate to hold the lever 30 in unlocked position when the actuating lever is moved as shown in broken lines in Fig. 4, the point 41 fitting around the pivot curve and against the upper part of the lever 30.

The movable or body frame 19 is provided with the lock casting 42 which is adapted to be engaged by the assembly 28, as shown in Figs. 3 and 4. This casting 42 is bolted to the frame 18 as shown and its lower end is provided with the spaced lugs 43 and 44 which are adapted to engage under the lip 33 of the lower casting and are adapted to receive between them the upper end of the locking lever 30. These lugs 43 and 44 have their outer corners beveled at 45 and 46 in order to have a cam action against the lever 30 and to thereby automatically engage it when the two locking members are moved together. When so locked the body is effectively restrained from both horizontal and vertical motion relative to the vehicle chassis.

As shown in Fig. 10 an additional lock or fastening device is provided adapted to prevent separation of the movable body frame 18 from the vehicle body 13 in case the above-described locking assemblies have been tampered with, have not been set, or fail to work. This lock consists of a chain 47 fastened to the fixed frame 14 by a staple 48 and adapted to be connected by means of a lock 49 to a similar staple 50 fastened to the movable body frame 18.

The V blocks or wedges 51 are attached by bolts or rivets to the rear end of the chassis frame 13 as best shown in Figs. 6, 7 and 8. These blocks are rigid and are inwardly knee braced at 52. The outer side of each block is formed with the rearwardly diverging V-shaped recess 53, the rear portion of which is flared inwardly at 54. The V blocks are perforated at 55.

The wedge blocks 56 are attached by the base members 57 to the front portion of the loading platform 12, the wedge members being pivotally connected to the base members by pivot pins 57ª. The wedge blocks 56 are similar in shape and size to the V-shaped recesses in the V blocks, and are provided with the perforations 58 adapted to register with the perforations 55 in the V blocks.

The point of the wedge block is flared outwardly at 59 as shown in Fig. 6 and its portion adjacent the base member 57 is provided with the feet 60 adapted to bear against the base member and prevent outward movement of the wedge block on its pivot beyond the position in which they are shown in Fig. 6. The pins 61 adapted to fit in the perforations 55 and 58 are provided, and are preferably hung upon the platform 12 adjacent the wedge blocks by chains 62.

In the use of my device, assuming the vehicle to have an empty body upon it, the wedge blocks 56 are swung outward into the position in which they are shown in Figs. 6, 7 and 8, and the vehicle is backed up to the platform, the V blocks 51 engaging the wedge blocks 56 as shown in Fig. 7 if unloaded, while if loaded the upper part of the wedge block engages the V block. The outward flare 59 of the wedge blocks and inward flare of the V blocks permits the two V blocks to pass between the wedge blocks even if the vehicle is backed a short distance to right or left of the correct position and the wedging action will shift the vehicle into proper alignment, the feet 60 supporting the wedge blocks against side thrust.

The wedge blocks are permanently secured to the platform face at a height intermediate the position which the V blocks will take when the vehicle chassis is entirely without load, and that the V blocks will occupy when the chassis carries a fully loaded body. In the present case, the body being empty the V and wedge blocks will have the relation shown in Fig. 7. As the vehicle is moved backward the lower side of the wedge blocks bear against the lower sides of the V recess 53 in the V blocks and the vehicle chassis is forced downward by the cam or wedge action until the parts assume the position shown in Fig. 8. The pins 61 are then inserted to maintain the chassis in close engagement with the platform. During this process the chassis has been forced downward and the vehicle springs and tires compressed. This position, however, as has been stated, is not as low as that the chassis would take when carrying a fully loaded body so that the strain on tires or springs is not injurious.

If the vehicle is provided with the lock shown in Fig. 18, the padlock 49 is unlocked and removed. The actuating levers 31 are now swung to the broken line position of Fig. 4 and the body is thus released for movement rearwardly. It rolls freely in the tracks 17 and may be readily hauled by hand off the truck chassis onto the platform. The platform may be provided with tracks of such an extent that the empty body may be rolled and switched to one side and a new body rolled onto the chassis over the same tracks, or where space is limited, it may be necessary now to pull out the pins 61 and drive the chassis to another such set of wedge blocks having a loaded body upon tracks adjacent them.

In either case the loaded body is rolled manually onto the chassis. As it reaches its forward position the retaining member 24 upon the chassis engages the similar member 27 upon the body and the meeting faces being upon an angle their wedge action serves to draw the forward end of the body firmly down upon the chassis and play or lost motion are eliminated. In the meantime the member 42 upon the body has moved opposite the member 28 on the chassis and their engaging overhanging portions restrain the body against upward or lateral motion. If the actuating levers 31 have been swung downwardly to full line position in Fig. 1 before the body is moved upon the chassis, the cam surface 45 upon the lug 43 will engage the lever 30 and thrust it against the spring 32 until the lug 43 has passed it when the lever will be forced between the lugs 43 and 44 by the spring, automatically locking the body to the chassis, and preventing any rebound as the body strikes the front stop. If the levers 31 were not swung downwardly before the body was pushed upon the chassis, they may be swung downward thereafter to lock the body as described. The padlock 49 may now again be used to connect the chassis and body by means of the chain 47.

The pins 61 are now removed and the vehicle is loaded and ready for movement. When discharging its loaded body and receiving another body at the other end of the run the procedure is identical with the exception that, since the chassis with its full load is somewhat lower than the level shown in Fig. 8, when the truck is backed up, the upper sides of the wedge blocks 56 will engage the upper side of the V recesses 53 and the rear of the chassis will be lifted to the level of the platform.

The wheels 22 are relatively large and move freely in the tracks 17 and since the chassis and platform are always upon the same level when a body is removed or replaced it is unnecessary to provide any mechanical means for moving the bodies on or off. Even a heavily loaded body may be readily moved by hand.

It should be noted that the wheels 22 are placed between the sills 19 and thus the increase in the height of the body above the chassis caused by the use of the wheels is quite small.

An important feature in regard to the wedge blocks is their ability to be folded back upon their hinges so that they do not project beyond the face of the platform. This permits trucks not provided with my device to be driven up to the same platform if desired and also permits the use of my device upon platforms abutting upon a street or side walk where city regulations prevent the use of permanent extensions or ramps.

Besides being of particular value in construction of new vehicles my invention may be readily applied to existing trucks. The fixed frame 14 may be readily constructed and shipped as a unit with the retaining member 24, rails 17, member 28 and stirrups 15 attached so that it may be readily and quickly fastened to any chassis. The V blocks may be attached by simply drilling a few holes in the chassis frame. The upper or movable frame 18 may also be constructed and shipped as a unit with retaining member 27 and members 42 attached and with or without a body built upon it. The wedge blocks 56 can be easily attached to any platform face. They may be shipped as a unit attached to a channel or I beam and properly spaced.

The lock and chain device shown in Fig. 10 is not an essential part of the invention but is desirable in general use of the device since it prevents accidental or malicious operation of the actuating handles 31 from permitting the body to be rolled from the chassis.

The whole construction is simple and is inexpensive to manufacture and is positive and effective in its operation.

The apparatus for aligning truck bodies with platforms is claimed in my co-pending application Serial No. 539,020, filed February 24, 1922, which is a division of this application.

I claim:

1. In combination with a vehicle chassis having a body receiving track thereupon, a body having members adapted to interfit with the track whereby the body may be moved longitudinally upon the chassis, engaging members located upon each side of the body and having laterally extending lugs thereon, engaging members upon the chassis adapted to engage the first mentioned members, and having portions extending above and behind the lugs thereof.

2. In combination with a vehicle chassis having a body receiving track thereupon, a body having members adapted to interfit with the track whereby the body may be moved longitudinally upon the chassis, engaging members located upon each side of the body and having laterally extending lugs thereon, engaging members upon the chassis adapted to engage the first mentioned members, and having portions extending above and behind the lugs thereof, and interengaging members upon one end of the body and the chassis adapted to wedge the body against the chassis.

3. In combination with a vehicle chassis having a body receiving track thereupon, a body having members adapted to interfit with the track whereby the body may be moved longitudinally upon the chassis, engaging members located upon each side of the body and having laterally extending spaced lugs thereon, engaging members upon the chassis adapted to engage the first mentioned members, and having portions adapted to removably interfit between the spaced lugs.

4. In combination with a vehicle chassis having a body receiving track thereupon, a body having members adapted to interfit with the track whereby the body may be moved longitudinally upon the chassis, engaging members located upon each side of the body and having laterally extending spaced lugs thereon, engaging members upon the chassis adapted to engage the first mentioned members, and having portions extending above the spaced lugs thereof and having portions adapted to removably interfit between the spaced lugs.

5. In combination with a vehicle chassis having a body receiving track thereupon, a body having members adapted to interfit with the track whereby the body may be moved longitudinally upon the chassis, engaging members located upon each side of the body and having laterally extending lugs thereon, engaging members upon the chassis adapted to engage the first mentioned members, and having portions extending above the lugs thereof and having a spring pressed lever, a portion of which is adapted to be maintained behind the lugs by spring pressure.

6. In combination with a vehicle chassis having a body receiving track thereupon, a body having members adapted to interfit with the track whereby the body may be moved longitudinally upon the chassis, engaging members located upon each side of the body and having laterally extending spaced lugs thereon, engaging members upon the chassis adapted to engage the first mentioned members, and having portions extending above the spaced lugs thereof and having a spring pressed lever a portion of which is adapted to be maintained between the spaced lugs by spring pressure, and a manually operable lever adapted to move said spring pressed lever out of engagement with said lugs.

7. In combination with a vehicle chassis having a body receiving track thereupon, a body having members adapted to interfit with the track whereby the body may be moved longitudinally upon the chassis, engaging members located upon each side of the body and having laterally extending lugs thereon, engaging members upon the chassis adapted to engage the first mentioned members, and having portions extending above the lugs thereof and having a spring pressed lever a portion of which is adapted to be maintained behind the lugs by spring pressure, and a manually operable lever adapted to move said spring pressed lever out of engagement with said lugs, the ends of said lugs being beveled whereby when said lugs and lever are moved longitudinally into juxtaposition the lever will be lifted and permitted to move into place behind said lugs.

8. In combination with a vehicle chassis having a body receiving track thereupon, a body having members adapted to interfit with the track whereby the body may be moved longitudinally upon the chassis, engaging members located upon each side of the body and having laterally extending spaced lugs thereon, engaging members upon the chassis adapted to engage the first mentioned members, and having portions extending above the spaced lugs thereof and having a spring pressed lever a portion of which is adapted to be maintained between the spaced lugs by spring pressure, and members upon the forward ends of the chassis and body having interengaging angular faces whereby the body is wedged downward against the chassis during the latter portion of its forward movement upon the chassis.

9. As an article of manufacture a transportation unit adapted to be mounted upon a vehicle chassis comprising a frame, means for detachably connecting the frame to the vehicle chassis, and a vehicle body fixedly attached upon said frame.

10. As an article of manufacture a frame to which a removable vehicle body is adapted to be fixedly attached, said frame having rollers for rolling the vehicle body off and on a truck chassis, and means on said frame for detachably connecting said frame to the truck chassis.

11. In combination with a vehicle chassis and a body removably mounted thereon, a lock assembly for retaining the body on the chassis and restraining it against horizontal and vertical movement relative thereto comprising a bracket on the chassis, a bracket on the body, projections on said brackets, and a movable lever on one of the brackets cooperating with the projections on the other bracket.

12. The combination of a vehicle chassis, a body removably mounted thereon, the body having lateral projections adjacent the chassis, and the chassis having projections overhanging said lateral projections to restrain upward movement of the body relatively to the chassis, the body being movable horizontally to bring its projections from beneath the overhanging projections of the chassis when the body is to be removed from the chassis.

13. The combination of a vehicle chassis, a body movable horizontally on the chassis, and having lateral projections extending transversely of its path of movement, and the chassis having projections overhanging said lateral projections when the body is in normal position, the projections on the body moving from beneath the projections on the chassis on horizontal movement of the body.

14. The combination of a vehicle chassis, a body movable longitudinally on the chassis, a bracket on the body having a lateral projection, a bracket on the chassis having an inward projection, overhanging said first named projection when the body is in normal position, whereby vertical separation of the body from the chassis is prevented, the projection on the body moving from beneath the projection on the chassis when the body is removed.

15. In combination with a vehicle chassis and a body therefor, a frame upon which the body is adapted to be mounted, and a subframe adapted to be mounted on the chassis, the two frames having mutually engaging parts permitting free movement of the body on and off the chassis.

16. In combination with a vehicle chassis and a body therefor, a frame upon which the body is adapted to be mounted, a subframe adapted to be mounted on the chassis, tracks on one of said frames, and means on the other frame cooperating with said tracks to convey the body on and off the chassis.

17. In combination with a vehicle chassis and a body therefor, a frame upon which the body is adapted to be mounted, and a subframe adapted to be mounted on the chassis, one of said frames having parallel rails and the other frame having rollers running on said rails.

18. In combination with a vehicle chassis and a body therefor, a frame upon which the body is adapted to be mounted, and a subframe adapted to be mounted on the chassis, the two frames having mutually engaging parts permitting free movement of the body on and off the chassis, and mutually engaging parts for locking the frames against relative movement.

19. As an article of manufacture a transportation unit adapted to be mounted upon a vehicle chassis comprising a frame adapted to have a vehicle body fixedly attached thereon, and means for detachably connecting the frame to the chassis.

Signed by me at Boston, Massachusetts, this thirteenth day of September, 1920.

DONALD W. PERIN.